(12) United States Patent
Niu et al.

(10) Patent No.: US 11,169,421 B2
(45) Date of Patent: Nov. 9, 2021

(54) LIQUID CRYSTAL DISPLAY AND DRIVING METHOD THEREOF

(71) Applicant: BOE TECHNOLOGY GROUP CO., LTD., Beijing (CN)

(72) Inventors: Xiaochen Niu, Beijing (CN); Xue Dong, Beijing (CN); Xiaochuan Chen, Beijing (CN); Wenqing Zhao, Beijing (CN); Chenyu Chen, Beijing (CN); Haiyan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 766 days.

(21) Appl. No.: 15/780,071

(22) PCT Filed: Nov. 13, 2017

(86) PCT No.: PCT/CN2017/110661
§ 371 (c)(1),
(2) Date: May 30, 2018

(87) PCT Pub. No.: WO2018/129998
PCT Pub. Date: Jul. 19, 2018

(65) Prior Publication Data
US 2021/0173264 A1      Jun. 10, 2021

(30) Foreign Application Priority Data

Jan. 13, 2017   (CN) ...................... 201710025919.X

(51) Int. Cl.
*G02F 1/1343*    (2006.01)
*G02F 1/1335*    (2006.01)
(Continued)

(52) U.S. Cl.
CPC ...... *G02F 1/134363* (2013.01); *G02F 1/1337* (2013.01); *G02F 1/133512* (2013.01);
(Continued)

(58) Field of Classification Search
None
See application file for complete search history.

(56) References Cited

U.S. PATENT DOCUMENTS

2011/0051412 A1* 3/2011 Jeong ................ G02F 1/133603
362/235
2011/0157497 A1* 6/2011 Kim ...................... G02B 30/27
349/15
(Continued)

FOREIGN PATENT DOCUMENTS

CN    101976002    2/2011
CN    102231033    11/2011
(Continued)

OTHER PUBLICATIONS

International Search Report and Written Opinion from PCT/CN2017/110661 dated Feb. 13, 2018 along with English translation of Written Opinion.

*Primary Examiner* — Shan Liu
(74) *Attorney, Agent, or Firm* — Calfee, Halter & Griswold LLP

(57) ABSTRACT

A liquid crystal display and a driving method thereof are provided. The liquid crystal display includes a backlight source, a lower substrate at a light exit side of the backlight source, an upper substrate opposite to the lower substrate, and a liquid crystal layer between the two substrates. The backlight source includes a plurality of light sources, and light emitted from each light source is collimated light. The liquid crystal display further includes at least one first electrode and at least one second electrode between the lower substrate and the liquid crystal layer and a light shielding structure, orthographic projections of the light source and the light shielding structure on the lower substrate overlapping. The first and second electrodes are configured to receive different voltages to form an electric field, so that liquid crystal molecules within the electric field are deflected to form convex lens structures.

15 Claims, 6 Drawing Sheets

(51) Int. Cl.
    *G02F 1/13357* (2006.01)
    *G02F 1/1337* (2006.01)
    *G09G 3/36* (2006.01)

(52) U.S. Cl.
    CPC .. *G02F 1/133514* (2013.01); *G02F 1/133526* (2013.01); *G02F 1/133602* (2013.01); *G09G 3/3607* (2013.01)

(56) References Cited

U.S. PATENT DOCUMENTS

| | | | |
|---|---|---|---|
| 2012/0105751 | A1 | 5/2012 | Mao et al. |
| 2012/0120333 | A1* | 5/2012 | Chen ................. G02B 3/14 349/33 |
| 2014/0233101 | A1* | 8/2014 | Takagi ................ G02F 1/29 359/463 |
| 2016/0085118 | A1* | 3/2016 | Lee .................... G02F 1/29 349/62 |
| 2017/0254518 | A1* | 9/2017 | Vasylyev ............. F21V 9/08 |

FOREIGN PATENT DOCUMENTS

| | | |
|---|---|---|
| CN | 103543552 | 1/2014 |
| CN | 203909438 | 10/2014 |
| CN | 105446013 | 3/2016 |
| CN | 106526993 | 3/2017 |
| CN | 106847208 | 6/2017 |
| JP | 9-166701 | 6/1997 |

* cited by examiner

LIQUID CRYSTAL DISPLAY AND DRIVING METHOD THEREOF

RELATED APPLICATION

The present application is the U.S. national phase entry of PCT/CN2017/110661, with an international filling date of Nov. 13, 2017, which claims the benefit of Chinese Patent Application No. 201710025919.X, filed on Jan. 13, 2017, the entire disclosure of which is incorporated herein by reference.

TECHNICAL FIELD

The present disclosure relates to the field of liquid crystal display technologies, and particularly to a liquid crystal display and a driving method thereof.

BACKGROUND

With the rapid development of display technologies, people have higher and higher requirements for display devices. Being light, thin and energy saving is always a development goal for display devices.

The display principle of a general liquid crystal display panel can be summarized as follows: natural light is converted into linearly polarized light by a polarizer below the array substrate, voltages are applied to the pixel electrode and the common electrode to form an electric field across the liquid crystal layer, liquid crystal molecules in the liquid crystal layer are deflected under the effect of the electric field to change the polarization state of the linearly polarized light which is then subjected to polarization by a polarizer on the color filter substrate, the polarization state can be controlled by controlling the magnitude of the electric field, and different polarization states mean different transmittances of light emitted from the display panel, thereby achieving grayscale display of an image.

It can be seen that, for the general liquid crystal display device, the upper and lower polarizers actually increase the thickness of the liquid crystal display device, making it difficult to achieve the purpose of being lighter and thinner. In addition, the use of polarizers consumes at least 50% of the light energy, and the requirement on the brightness of the liquid crystal display device can only be satisfied by increasing the brightness of the backlight. This will undoubtedly increase the power consumption of the liquid crystal display device, making it difficult to achieve the purpose of being energy-saving.

SUMMARY

The liquid crystal display provided by an embodiment of the present disclosure comprises a backlight source, a lower substrate at a light exit side of the backlight source, an upper substrate opposite to the lower substrate, and a liquid crystal layer between the upper substrate and the lower substrate. The backlight source includes a plurality of light sources, and light emitted from each of the light sources is incident into the liquid crystal layer in a collimated manner. The liquid crystal display further comprises a plurality of first electrodes and a plurality of second electrodes located between the lower substrate and the liquid crystal layer, the first electrode and the second electrode being disposed in a same layer alternately at intervals; and a light shielding structure in one-to-one correspondence with each of the light sources of the backlight source, orthographic projections of the light source of the backlight source and the light shielding structure on the lower substrate overlapping. The first electrode and the second electrode are configured to receive different voltages during operation of the liquid crystal display to form an electric field, so that liquid crystal molecules within a region of the electric field are deflected to form a convex lens structure.

In some embodiments, the liquid crystal display further comprises a controller for adjusting a voltage difference between the first electrode and the second electrode so as to adjust a curvature of the lens structure.

In some embodiments, the larger the curvature of the lens structure is, the larger an exit angle of light exiting from the lens structure will be.

In some embodiments, the larger the voltage difference between the first electrode and the second electrode is, the larger the curvature of the lens structure will be.

In some embodiments, a refractive index of a center portion of the convex lens structure for light of the backlight source is larger than refractive indexes of other portions of the lens structure for light of the backlight source.

In some embodiments, the liquid crystal display comprises a plurality of sub-pixels arranged in an array, the sub-pixels being in one-to-one correspondence with the lens structures, the lens structures being in one-to-one correspondence with the light sources of the backlight source.

In some embodiments, the first electrode and the second electrode are of a same structure and are arranged in an array.

In some embodiments, a distance between the first electrode and an adjacent second electrode is less than or equal to 3 μm.

In some embodiments, the first electrode and the second electrode are both strip electrodes.

In some embodiments, the light shielding structure is located between the upper substrate and the liquid crystal layer.

In some embodiments, the liquid crystal display further comprises a first alignment film located between the lower substrate and the liquid crystal layer, and a second alignment film located between the liquid crystal layer and the upper substrate.

In some embodiments, the liquid crystal display further comprises a light color conversion layer. The light color conversion layer is located at a side of the liquid crystal layer facing the upper substrate, and used for converting light transmitted through regions of the liquid crystal layer corresponding to the lens structures into monochromatic light; or the light color conversion layer is located at a side of the liquid crystal layer facing the lower substrate, and used for converting light emitted by the backlight source and corresponding to the lens structures into monochromatic light.

In some embodiments, the light color conversion layer comprises a light splitting film or a color filter film, and converted light corresponding to different lens structures includes at least three colors.

In some embodiments, the first electrode and the second electrode are transparent electrodes.

In some embodiments, the light source comprises a laser, and the light shielding structure comprises a black matrix.

Another embodiment of the present disclosure provides a driving method for a liquid crystal display for driving a liquid crystal display according to any of the foregoing embodiments. The method may comprise receiving a signal for an image to be displayed; controlling voltages supplied to the first electrode and the second electrode according to a grayscale value for each sub-pixel in the signal for an image to be displayed, so as to control the curvature of the convex lens structure.

DETAILED DESCRIPTION OF EMBODIMENTS

Figure 1:
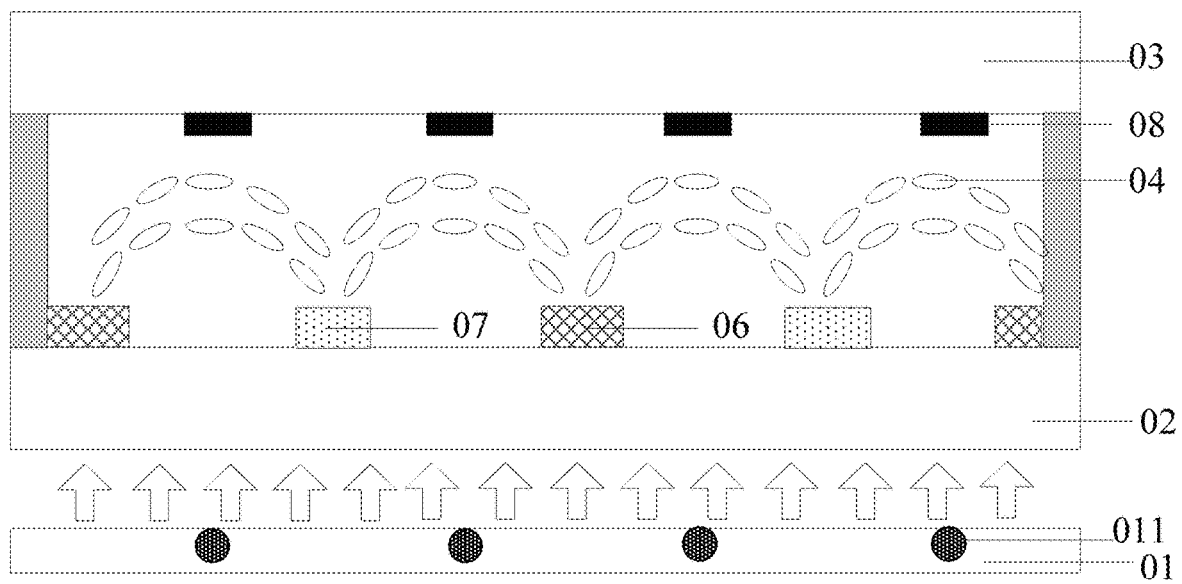
FIG. 1 is a schematic diagram of a liquid crystal display provided by an embodiment of the present disclosure.

To make the objectives, technical solutions, and advantages of the disclosure clearer, embodiments of the present disclosure will be further described in detail below with reference to the accompanying drawings. The described embodiments are merely a part of the embodiments of the disclosure, rather than all of them. All other embodiments obtained by those ordinarily skilled in the art based on the embodiments of the present disclosure without inventive efforts shall fall within the protection scope of the disclosure.

Embodiments of the disclosure provide a liquid crystal display and a driving method thereof, so as to reduce the use of polarizers in the liquid crystal display, thereby achieving the purpose of making a liquid crystal display device thinner, lighter, and energy-saving.

The shapes and sizes of the components in the drawings are not shown true to scale and are only intended to illustrate the embodiments in the present disclosure.

A liquid crystal display provided by an embodiment of the present disclosure, as shown in FIG. 1, comprises: a backlight source 01, a lower substrate 02 at the light exit side of the backlight source 01, an upper substrate 03 opposite to the lower substrate 02, and a liquid crystal layer 04 between the upper substrate 03 and the lower substrate 02. The backlight source 01 includes a plurality of light sources 011, and light emitted from each light source 011 is incident into the liquid crystal layer 04 in a collimated manner. The liquid crystal display further comprises a plurality of first electrodes 06 and a plurality of second electrodes 07 between the lower substrate 02 and the liquid crystal layer 04, the first electrode 06 and the second electrode 07 being arranged in the same layer alternately at intervals, and a light shielding structure 08 in one-to-one correspondence with each light source 011 of the backlight source, orthographic projections of the light source 011 and the light shielding structure 08 on the lower substrate overlapping. The first electrode 06 and the second electrode 07 are configured to receive different voltages during operation of the liquid crystal display to form an electric field, so that liquid crystal molecules within the electric field region are deflected to form a convex lens structure.

In an embodiment, the liquid crystal display further comprises a controller (not shown in the figure) for adjusting a voltage difference between the first electrode 06 and the second electrode 07, so as to adjust the curvature of the lens structure formed by the liquid crystal molecules within the electric field. In addition, the light source 011 includes, but is not limited to, a laser light source, and light emitted from the laser light source may substantially be regarded as collimated light. Of course, the light source 011 may also include a combination of a light emitting device and an optical element, so as to emit collimated light. The specific implementation of the light source is not so limited in the disclosure.

When the liquid crystal display performs displaying, the voltages applied to the first electrode 06 and the second electrode 07 control the liquid crystal molecules in a corresponding region in the liquid crystal layer 04 to be deflected to form a convex lens structure, and the controller can adjust the voltage difference between the first electrode 06 and the second electrode 07 so as to adjust the curvature of the formed lens structure.

The light shielding structure in the embodiment of the disclosure includes, but is not limited to, a black matrix, which may be disposed between the liquid crystal layer and the upper substrate or between the liquid crystal layer and the lower substrate. No specific limitation is made here. FIG. 1 illustrates an example in which the light shielding structure is disposed between the upper substrate 03 and the liquid crystal layer 04, but the present disclosure is not limited thereto.

In an embodiment, in order to realize a dark mode, the light shielding structures in the embodiment of the disclosure are in one-to-one correspondence with the light sources in the backlight source, for shielding light emitted from the light sources in the backlight source. Specifically, in case the liquid crystal molecules in the liquid crystal display are negative liquid crystals, in an initial state, the long axis of the liquid crystal molecule is parallel to the upper substrate or the lower substrate, there is no potential difference between the first electrode and the second electrode, so the liquid crystal molecules in the liquid crystal layer are not deflected, and the lens structure is not formed in the liquid crystal layer, thus light from the light sources in the backlight source are incident on the light shielding structures, so that the dark mode is realized by means of the shielding of the light shielding structures. If the liquid crystal molecules in the liquid crystal display are positive liquid crystals, in an initial state, the long axes of the liquid crystal molecules are perpendicular to the upper substrate or the lower substrate, and the initial state of the liquid crystal display is a normally white mode. In order to realize a dark mode for the liquid crystal display, a potential difference is imposed between the first electrode and the second electrode so that the liquid crystal molecules are deflected, and the long axes of the liquid crystal molecules are parallel to the horizontal electric field lines between the first electrode and the second electrode, thus the collimated light from the light sources is incident on the light shielding structures after being refracted by the lens structure, so that the dark mode is realized by the shielding of the light shielding structures.

For the liquid crystal display provided by the embodiment of the disclosure, when the liquid crystal display performs displaying, the electric field between the first electrode and the second electrode can control the liquid crystal molecules of corresponding regions in the liquid crystal layer to be deflected to form convex lens structures, and the controller can adjust the voltage difference between the first electrode and the second electrode so as to control the curvature of the formed lens structure. Therefore, in the embodiment of the disclosure, a convex lens structure is formed in the liquid crystal layer under the effect of the voltage difference between the first electrode and the second electrode, and the collimated light at the light exit side of the backlight source is refracted to different degrees by means of the refraction function of the lens structure, thereby achieving grayscale display. Since the collimated light at the light exit side of the backlight source is in the same direction and belongs to linearly polarized light, the light after being refracted by the convex lens structure is polarized light. It can be seen that there is no need for the liquid crystal display provided by the embodiment of the disclosure to employ upper and lower polarizers to achieve grayscale display, which can decrease the thickness of the liquid crystal display and reduce the power consumption thereof, making a liquid crystal display device lighter, thinner and energy-saving.

Curvature is a measurement of the degree of unevenness of a geometry. The reciprocal of the curvature is the radius of curvature. The radius of curvature of an arc is the radius of a circle with the arc being part of the circle. The larger the radius of curvature is, the gentler the arc will be. The smaller the radius of curvature is, the steeper the arc will be. Therefore, the larger the curvature of the convex lens structure is, the smaller the radius of curvature is, the steeper the arc of the convex lens structure is, and the greater the refraction to the collimated light is. The incident collimated light is refracted by the convex lens structure. The curvatures of different convex lens structures can be different, the angles of the light obtained by refracting the collimated light can be different, thereby achieving grayscale display. Further, since the light entering the convex lens structure is collimated light and is in the same direction, and exit light after being refracted by the lens structure is still polarized light, using polarizers to control the grayscale can be avoided. In an embodiment of the disclosure, grayscale display is achieved by utilizing the refraction function of the convex lens structure formed in the liquid crystal layer. In addition, the convex lens structure mentioned in the embodiment of the disclosure, includes, but is not limited to, a hemispherical structure, a larger-hemispherical or smaller-hemispherical structure, and a semielliptical structure, which is not specifically limited herein.

The principle of the disclosure will be described in detail below with reference to specific examples. It is to be noted that these examples are for better explanation of the disclosure but do not limit it.

Figure 2:
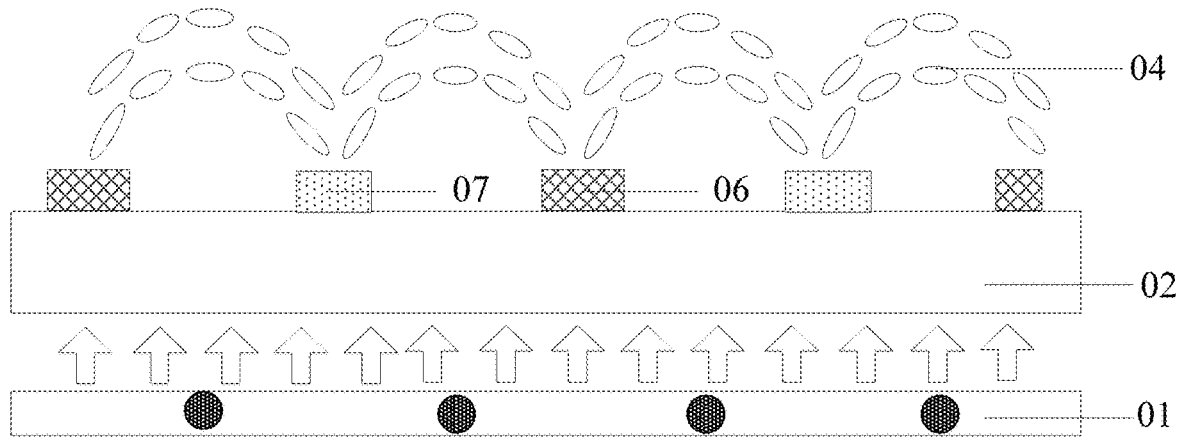
FIGS. 2(a) and 2(b) are used for illustrating lens structure in a liquid crystal display provided by an embodiment of the present disclosure, respectively.
Figure 2:
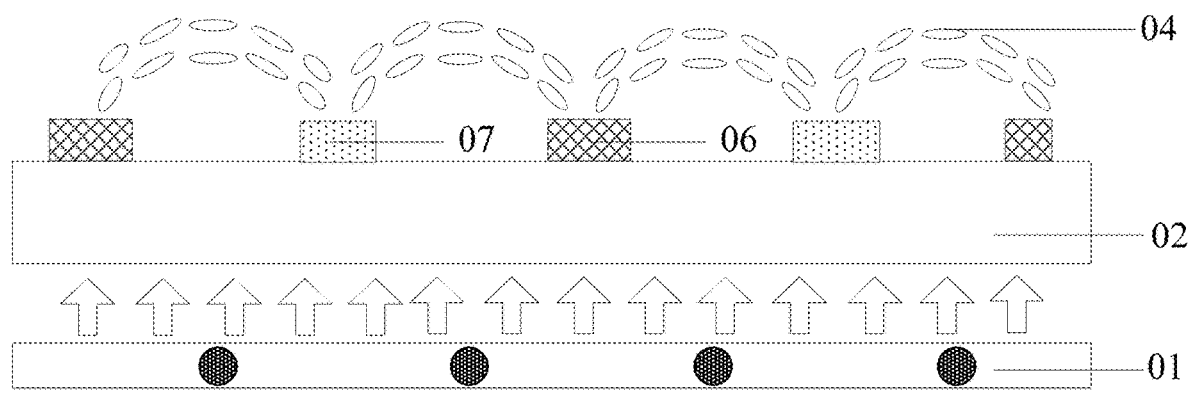

In the above liquid crystal display provided by an embodiment of the disclosure, grayscale display is achieved by controlling the curvature of the lens structure. The larger the curvature of the lens structure is, the larger the angle at which light of the backlight source is refracted will be, and the larger the grayscale to which the lens structure corresponds is. Specifically, as shown in FIGS. 2(a) and 2(b), the light shielding structure 08 is disposed between the upper substrate 03 and the liquid crystal layer 04, and the curvature of the convex lens structure shown in FIG. 2(a) is larger than that of the lens structure shown in FIG. 2(b). That is, the curved surface of the convex lens structure shown in FIG. 2(a) is more curved, thus the curvature is larger. In other words, the thicker the formed lens structure in the cell thickness direction is, the larger the curvature will be. The larger the curvature of the lens structure is, the higher degree of the refraction of light is, so that the exit light incident on the upper substrate after being dispersed has a larger area. On the contrary, the curvature of the lens structure shown in FIG. 2(b) is smaller, thus light is less refracted, so that the exit light incident on the upper substrate has a small area for it is dispersed to a relatively low degree. Each lens structure may correspond to a sub-pixel for controlling grayscale display of the sub-pixel. The collimated light of the backlight source incident on each lens structure has the same brightness, but light incident on the upper substrate after being refracted by different lens structures may have different incident areas. After the refraction by the lens structure, light may be incident onto the sub-pixel corresponding to the lens structure, or may be incident onto a sub-pixel adjacent to the sub-pixel corresponding to the lens structure, forming a grayscale around the shielding structure 08 corresponding to the lens structure. Therefore, the smaller the exit angle of the exit light from the lens structure is, the smaller the area of the light incident onto the upper substrate will be, and the smaller the grayscale value of the sub-pixel corresponding to the lens structure is. Conversely, the larger the exit angle of the exit light from the lens structure is, the larger the area of the light incident on the upper substrate will be, and the larger the grayscale value of the sub-pixel corresponding to the lens structure is.

Figure 3:
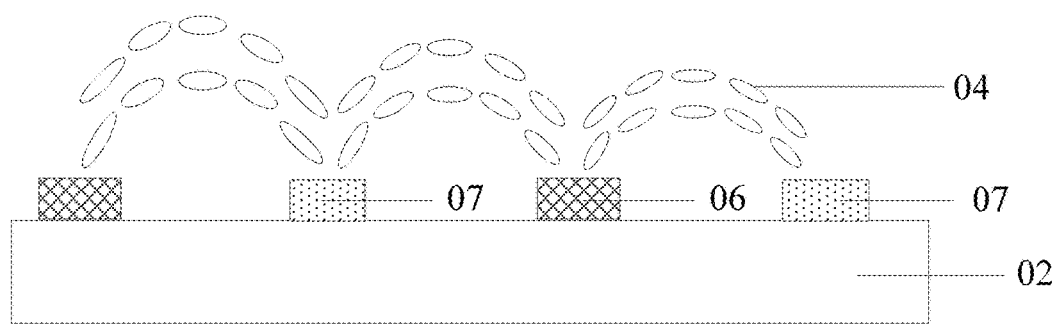
FIG. 3 is a schematic diagram of another lens structure in a liquid crystal display provided by another embodiment of the present disclosure.

In the liquid crystal display provided by the embodiment of the present disclosure, the curvature of the lens structure is formed under the effect of the electric field between the first electrode and the second electrode. Therefore, the larger the curvature of the lens structure is, the larger the voltage difference between the electrode structures to which the liquid crystal molecules that form the lens structure correspond is. Specifically, for example, as shown in FIG. 3, the liquid crystal display comprises a first electrode 06 and a second electrode 07. Voltage differences between adjacent two of the four electrodes from left to right are V1, V2, and V3 in sequence, where V1>V2>V3, so the curvatures of the lens structures decrease sequentially.

Figure 4:
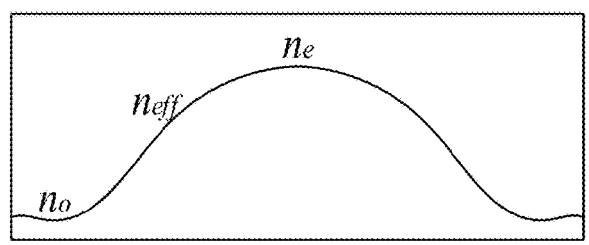
FIG. 4 is a curve schematic diagram illustrating the refractive indexes of a lens structure provided by an embodiment of the present disclosure.

In an embodiment, the larger the equivalent optical path of each lens structure along the cell thickness direction of the liquid crystal display is, the higher degree of refraction for the light of the backlight source is. Specifically, for each lens structure, the electric field lines at the thickest portion of the lens structure are substantially parallel to the upper substrate or the lower substrate, and the electric field lines at the thinnest portion of the lens structure are substantially perpendicular to the upper substrate or the lower substrate. According to the principle of refraction of the convex lens structure, the thickest lens portion of the lens structure in the cell thickness direction has a maximum refractive index, the thinnest lens portion of the lens structure in the cell thickness direction has a minimum refractive index, and the portion between the thickest portion and the thinnest portion of the lens structure has a refractive index between the maximum refractive index and the minimum refractive index. As shown in FIG. 4, the thickest portion of the lens structure in the cell thickness direction has a refractive index of ne, the thinnest portion of the lens structure in the cell thickness direction has a refractive index of no, and the transitional region of the lens structure has a refractive index of neff, where neff is between ne and no. Therefore, a convex lens structure is formed in the liquid crystal layer under the effect of an electric field, and the collimated light of the backlight source is refracted to different degrees by means of the refractive indexes of the lens structure, so that the exit angles of the exit light from the lens structure are different, thereby achieving different grayscale displays.

Specifically, after the collimated light of the backlight source has been refracted by the lens structure having different refractive indexes, any light beam can be decomposed into light having a polarization direction parallel to the horizontal direction and light having a polarization direction perpendicular to the horizontal direction. The lens of a convex structure formed between the first electrode and the second electrode has a refraction effect in any direction. Therefore, after the refraction by the lens structure, the exit light is still polarized light, and there is no need to employ upper and lower polarizers to polarize the light.

Figure 5:
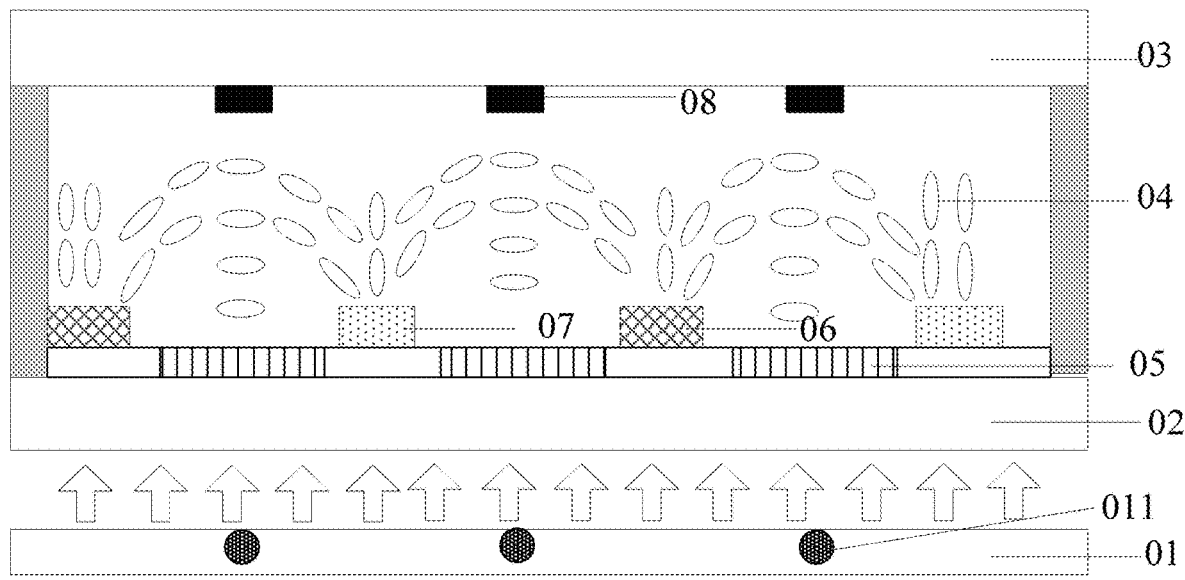
FIG. 5 is a schematic diagram of a liquid crystal display provided by another embodiment of the present disclosure.

In the liquid crystal display provided by an embodiment of the present disclosure, referring to FIG. 5, the liquid crystal display panel further comprises a color filter layer including a plurality of color filter blocks 05 arranged in an array. Each color filter block 05 is corresponding to a lens structure, and the lens structures are in one-to-one correspondence with the light sources 011 of the backlight source. In this example, the plurality of color filter blocks in an array are located on the lower substrate of the liquid crystal display panel. Therefore, in this embodiment, each light source corresponds to one color filter block, and each color filter block corresponds to a convex lens structure.

Figure 6:
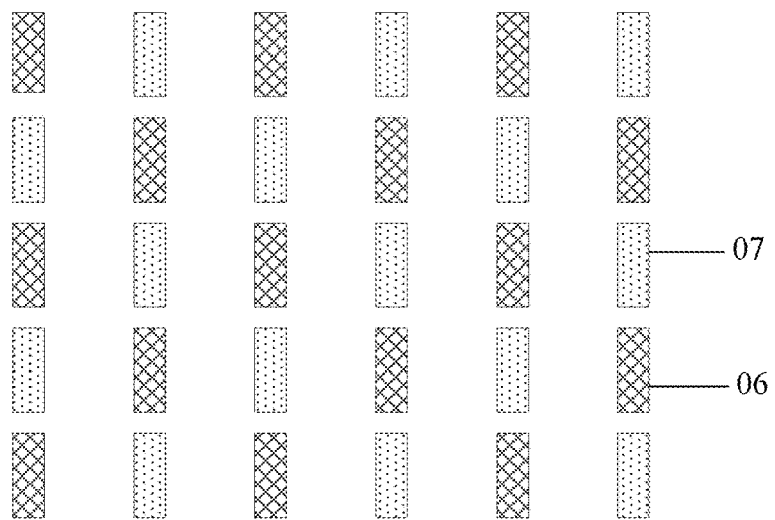
FIG. 6 is a schematic diagram illustrating a first electrode and a second electrode provided by another embodiment of the present disclosure.

For a liquid crystal display according to another embodiment of the disclosure, referring to FIG. 6, the first electrodes 06 and the second electrodes 07 have the same structure and are arranged in an array. Specifically, the first electrodes and the second electrodes are disposed in the same layer between the liquid crystal layer and the lower substrate, the lens structures formed between the first electrodes and the second electrodes are in one-to-one correspondence with the subpixels, i.e., each subpixel corresponds to a convex lens structure, and grayscale display of each subpixel is achieved by controlling the curvature of the convex lens structure. The first electrodes and the second electrodes are arranged in an array. In order to make the lens structures formed between the first electrodes and the second electrodes have the same orthographic projection on the lower substrate, the first lens electrodes and the second lens electrodes are of the same structure. Each first electrode 06 and each of the four adjacent second electrodes 07 can generate an electric field, or each second electrode 07 and each of the four adjacent first electrodes 06 can generate an electric field. The liquid crystal molecules within the electric field region may constitute a convex lens structure.

It is to be noted that the first electrode and the second electrode are only illustrated as a block structure in FIG. 6, but they are not limited to having a block shape, and it is also possible for the first electrode and the second electrode to have other shapes, which is not specifically limited herein. In addition, the shapes of the first electrode and the second lens electrode may be the same or different, which is not specifically limited herein.

In a specific embodiment, in the liquid crystal display provided by an embodiment of the disclosure, referring to FIG. 6, the first electrode 06 and the second electrode 07 are both strip electrodes.

In a specific embodiment, in order to enable the lens structure formed under the effect of the electric field between the first electrode and the second electrode to have good refraction function, in the liquid crystal display provided by an embodiment of the disclosure, the distance between the first electrode and the adjacent second electrode is less than or equal to 3 μm. The distance between the first electrode and the second electrode is sufficiently small, so that the formed lens structure is small enough to have good refraction function.

In the liquid crystal display provided by an embodiment of the disclosure, referring to FIG. 1, the light shielding structure 08 is located between the upper substrate 03 and the liquid crystal layer 04. The light shielding structure 08 may also be disposed between the lower substrate 02 and the first electrode 06, which is not limited herein. In FIG. 1, only one specific embodiment is illustrated, but the present disclosure is not limited to the structure shown in FIG. 1.

Figure 7:
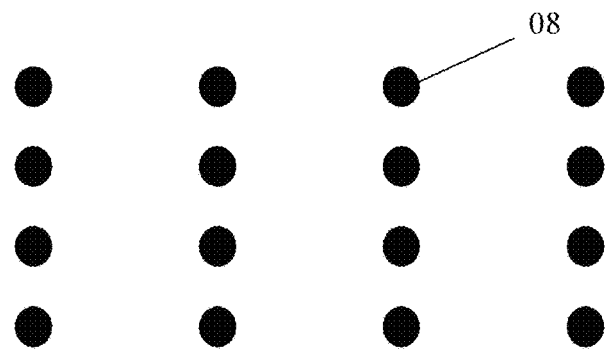
FIGS. 7(a) and 7(b) are schematic diagrams of light shielding structures provided by an embodiment of the present disclosure, respectively.
Figure 7:
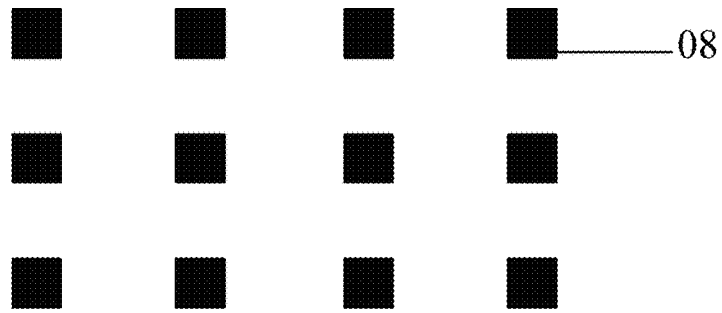

Specifically, as shown in FIG. 7(a), the light shielding structures 08 are circular structures in one-to-one correspondence with the light sources of the backlight source. Alternatively, the light shielding structures 08 shown in FIG. 7(b) are rectangular structures in one-to-one correspondence with the light sources of the backlight source. No specific limitation is made in this regard to the disclosure.

Figure 8:
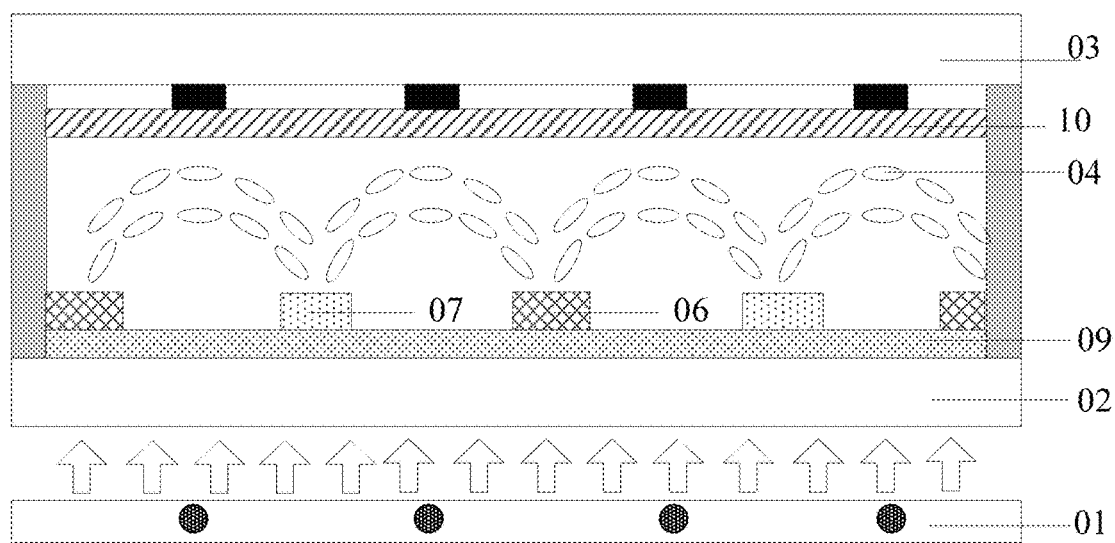
FIG. 8 is a schematic structural diagram of a liquid crystal display provided by a further embodiment of the present disclosure.

In an embodiment, if the liquid crystal molecules in the liquid crystal display are negative liquid crystals, the long axes of the liquid crystal molecules are parallel to the upper substrate or the lower substrate in an initial state, and a complicated rubbing method is needed to distribute the liquid crystal molecules in this case. In the liquid crystal display provided by an embodiment of the present disclosure, referring to FIG. 8, the liquid crystal display further comprises a first alignment film 09 between the lower substrate and the liquid crystal layer 04, and a second alignment film 10 between the liquid crystal layer 04 and the upper substrate 03, the second alignment film 10 may be disposed between the light shielding structure 08 and the liquid crystal layer 04. When the liquid crystal molecules in the liquid crystal display are positive liquid crystals, in an initial state, the long axes of the liquid crystal molecules are perpendicular to the upper substrate or the lower substrate, thus there is no need to dispose the first alignment film and the second alignment in the liquid crystal display of this structure. The first alignment film and the second alignment film in the embodiment of the disclosure have the same function, and the first alignment film and the second alignment film are only used to distinguish the locations of the film layers, which have no other meaning.

Figure 9:
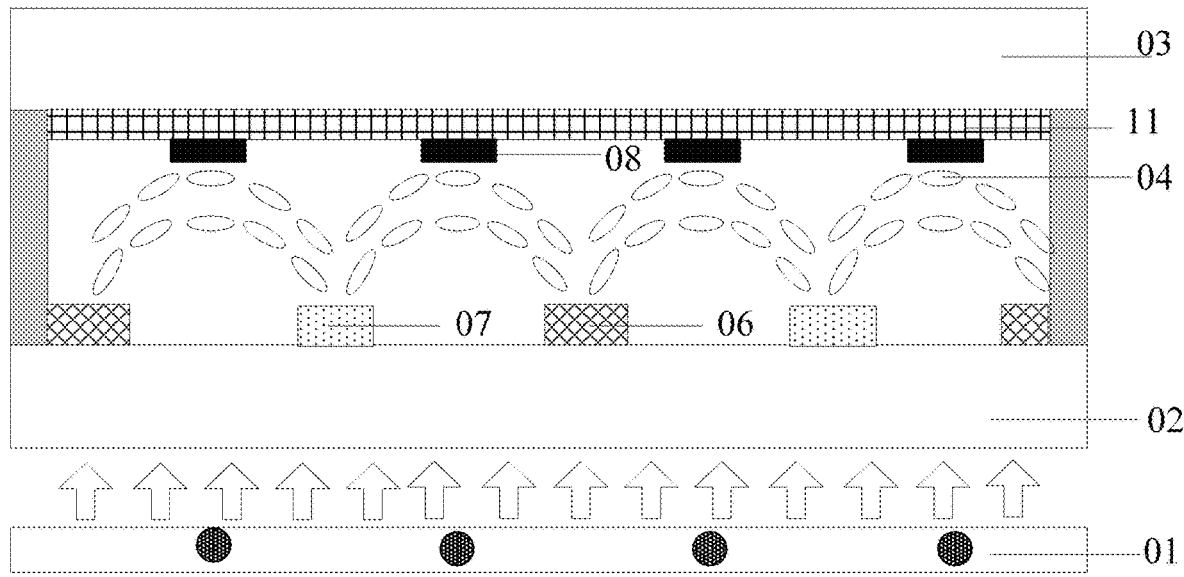
FIGS. 9(a) and 9(b) are schematic structural diagrams of a liquid crystal display provided by a further embodiment of the present disclosure, respectively.
Figure 9:
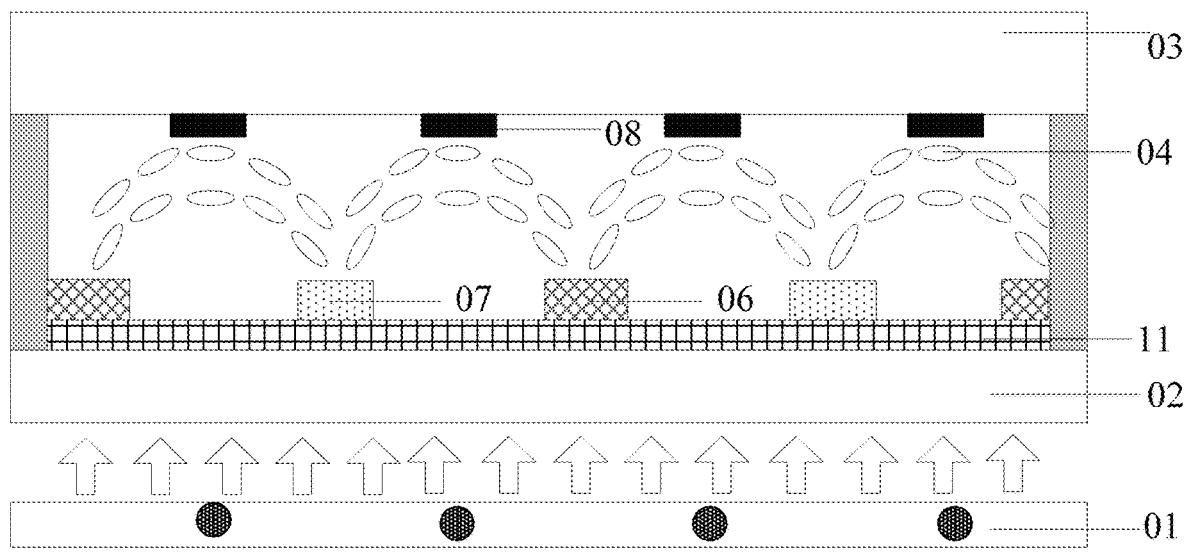

In the liquid crystal display provided by a further embodiment of the present disclosure, as shown in FIGS. 9(a) and 9(b), the liquid crystal display further comprises a light color conversion layer 11. As shown in FIG. 9(a), the light color conversion layer 11 is located at a side of the liquid crystal layer 04 facing the upper substrate 03 and is used for converting light transmitted through regions of the liquid crystal layer corresponding to the lens structures into monochromatic light. The light color conversion layer 11 may be disposed between the light shielding structure 08 and the upper substrate 03, or between the light shielding structure 08 and the liquid crystal layer 04. Alternatively, as shown in FIG. 9(b), the light color conversion layer 11 is located on a side of the liquid crystal layer 04 facing the lower substrate 02 and is used for converting light emitted by the backlight source in regions corresponding to the lens structures into monochromatic light. The converted light corresponding to different lens structures includes at least three colors. In FIG. 9(b), the light color conversion layer 11 is disposed between the first electrode 06 and the lower substrate 02, and the light color conversion layer 11 may also be disposed between the liquid crystal layer 04 and the first electrode 06. No limitation is made in this regard to the disclosure.

Figure 10:
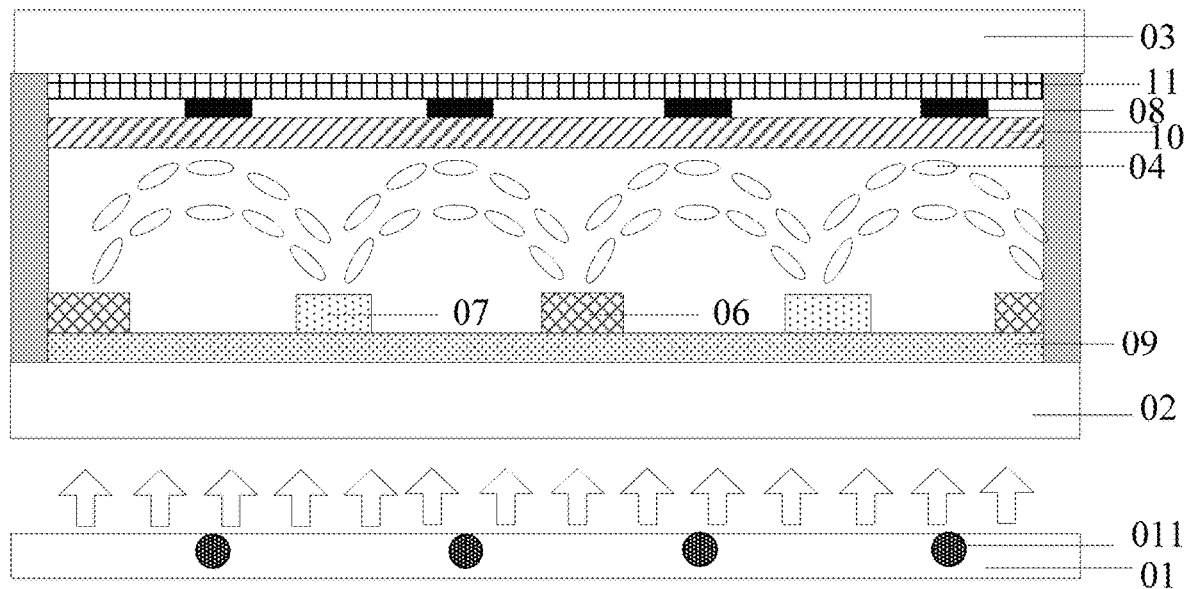
FIGS. 10(a) and 10(b) are schematic structural diagrams of a liquid crystal display provided by yet another embodiment of the present disclosure, respectively.
Figure 10:
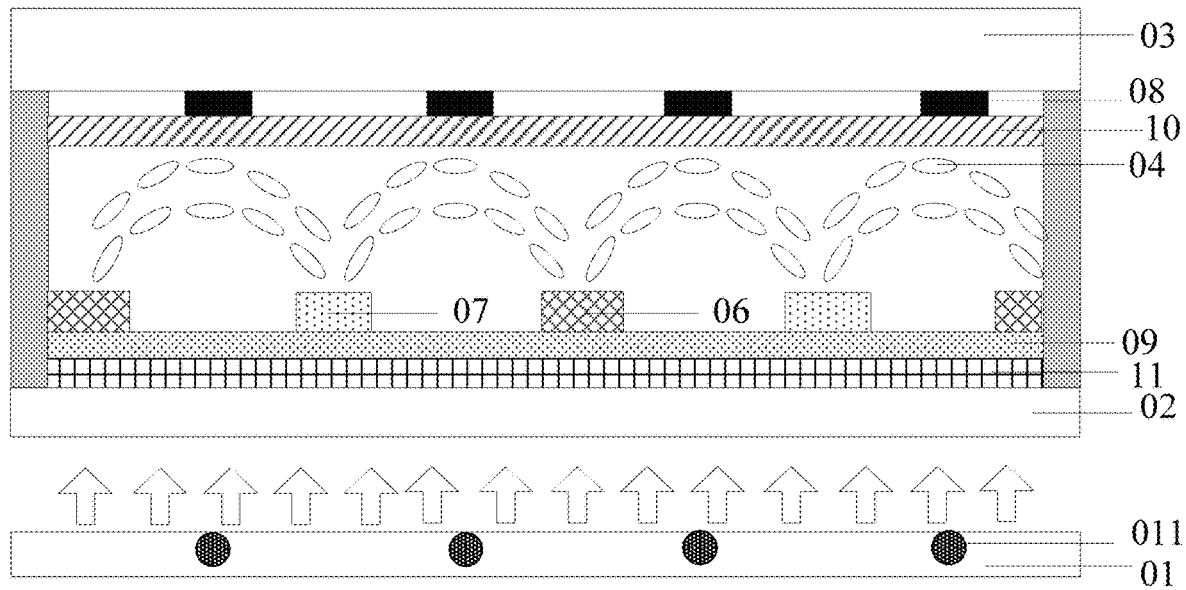

In a further embodiment, as shown in FIG. 10(a), the light shielding structure 08 in the liquid crystal display is disposed between the upper substrate 03 and the liquid crystal layer 04, and the liquid crystal display further comprises a second alignment film 10 between the light shielding structure 08 and the liquid crystal layer 04, a first alignment film 09 between the lower substrate 02 and the first electrode 06, and a light color conversion layer 11 between the light shielding structure 08 and the upper substrate 03. According to another embodiment, as shown in FIG. 10(b), the liquid crystal display comprises a light shielding structure 08 disposed between the liquid crystal layer 04 and the upper substrate 03, a first alignment film 09 between the lower substrate 02 and the liquid crystal layer 04, a second alignment film 10 between the liquid crystal layer 04 and the upper substrate 03, and a light color conversion layer 11 between the first alignment film 09 and the lower substrate 02. FIGS. 10(a) and 10(b) are merely schematic embodiments of the disclosure, and the position of the light color conversion layer 11 is so limited. The light color conversion layer 11 may also be disposed in any film layer between the liquid crystal layer 04 and the upper substrate 03, or disposed in any film layer between the lower substrate 02 and the liquid crystal layer 04. No limitation is made in this regard to the disclosure. In a further embodiment, the light shielding structure 08 and the light color conversion layer 11 may also be provided in the same layer.

It is to be noted that light of one color may correspond to one sub-pixel in the liquid crystal display. In the liquid crystal display provided by an embodiment of the disclosure, one lens structure corresponds to at least one sub-pixel. The liquid crystal display includes sub-pixels of at least three colors, for example, red sub-pixels, blue sub-pixels, and green sub-pixels.

In the liquid crystal display provided by an embodiment of the disclosure, one lens structure corresponds to one sub-pixel, that is, the light color conversion layer converts light in regions corresponding to the lens structures only into light of one color.

In a specific embodiment, the light color conversion layer 11 may include a light splitting film or a color filter film.

In the liquid crystal display provided by an embodiment of the disclosure, any of the electrodes is a transparent electrode. That is, each electrode unit in the first electrodes and the second electrodes is a transparent electrode, so as to avoid shielding light. The electrode may be made of indium tin oxide or other materials. No specific limitation is made in this regard to the disclosure.

Based on the same inventive concept, a further embodiment of the present disclosure further provides a driving method for a liquid crystal display according to any of the foregoing embodiments. The method comprises receiving a signal for an image to be displayed, and controlling voltages supplied to the first electrode and the second electrode according to a grayscale value for each sub-pixel in the signal for the image to be displayed, so as to control the curvature of the convex lens structure.

To sum up, as for the liquid crystal display and the driving method thereof provided by the embodiments of the disclosure, upon display, the first electrode and the second electrode can control liquid crystal molecules of corresponding regions in the liquid crystal layer to be deflected to form a convex lens structure, and the controller can adjust the voltage difference between the first electrode and the second electrode so as to control the curvature of the formed lens structure. Therefore, a convex lens structure is formed in the liquid crystal layer under the effect of the voltage difference between the first electrode and the second electrode, and the collimated light at the light exit side of the backlight source is refracted to different degrees by means of the refraction of the lens structure, thereby achieving grayscale display. In addition, the collimated light at the light exit side of the backlight source is in the same direction, and the light after being refracted by the convex lens structure is still polarized light. It can be seen that there is no need for the liquid crystal display provided by the embodiments of the disclosure to employ upper and lower polarizers to achieve grayscale display, which can decrease the thickness of the liquid crystal display and reduce the power consumption thereof, thereby making a liquid crystal display device thinner, lighter, and energy-saving.

It will be apparent to those skilled in the art that various modifications and variations can be made to the embodiments in the disclosure without departing from the spirit and scope of the disclosure. Thus, if these modifications and variations fall within the scope of the claims of the disclosure and their equivalent technologies, the disclosure is also intended to include these modifications and variations.

The invention claimed is:

1. A liquid crystal display, comprising:
a backlight source;
a lower substrate disposed at a light exit side of the backlight source;
an upper substrate opposite to the lower substrate; and
a liquid crystal layer between the upper substrate and the lower substrate,
wherein the backlight source comprises a plurality of light sources, wherein light emitted from each of the light sources is incident into the liquid crystal layer in a collimated manner, and
wherein the liquid crystal display further comprises:
a plurality of first electrodes and a plurality of second electrodes, wherein each of the first and second electrodes are disposed between the lower substrate and the liquid crystal layer, and wherein the first electrodes and the second electrodes are each further disposed in a same layer alternately at intervals; and
a light shielding structure in one-to-one correspondence with each light source of the backlight source, wherein orthographic projections of the light source of the backlight source and the light shielding structure on the lower substrate are overlapping,
wherein each of the first electrodes and the second electrodes are configured to receive different voltages during operation of the liquid crystal display to form an electric field, so that liquid crystal molecules within a region of the electric field can be deflected to form a plurality of convex lens structures,
wherein the light shielding structure is located between the upper substrate and the liquid crystal layer.

2. The liquid crystal display according to claim 1, wherein the liquid crystal display further comprises a controller for adjusting a voltage difference between each of the first electrodes and the second electrodes so as to adjust a curvature of the lens structures.

3. The liquid crystal display according to claim 1, wherein the larger a curvature of a lens structure is, the larger an exit angle of light exiting from the lens structure will be.

4. The liquid crystal display according to claim 1, wherein the larger a voltage difference between a first electrode and a second electrode is, the larger a curvature of a corresponding lens structure will be.

5. The liquid crystal display according to claim 1, wherein a refractive index of a center portion of a convex lens structure for light of the backlight source is larger than refractive indexes of other portions of the lens structure for light of the backlight source.

6. The liquid crystal display according to claim 1, wherein the first electrodes and the second electrodes are of a same structure and are arranged in an array.

7. The liquid crystal display according to claim 6, wherein a distance between a first electrode and an adjacent second electrode is less than or equal to 3 µm.

8. The liquid crystal display according to claim 1, wherein the first electrodes and the second electrodes are each disposed in strips of electrodes.

9. The liquid crystal display according to claim 1, wherein the liquid crystal display further comprises a first alignment film between the lower substrate and the liquid crystal layer, and a second alignment film between the liquid crystal layer and the upper substrate.

10. The liquid crystal display according to claim 1, wherein the liquid crystal display further comprises a light color conversion layer, wherein the light color conversion layer is located at a side of the liquid crystal layer facing the upper substrate, for converting light transmitted through a region of the liquid crystal layer corresponding to a lens structure into monochromatic light, or the light color conversion layer is located at a side of the liquid crystal layer facing the lower substrate, for converting light emitted by the backlight source and corresponding to the lens structure into monochromatic light.

11. The liquid crystal display according to claim 10, wherein the light color conversion layer comprises a light splitting film or a color filter film, wherein converted light corresponding to different lens structures includes at least three colors.

12. The liquid crystal display according to claim 1, wherein each of the first electrodes and the second electrodes are transparent electrodes.

13. The liquid crystal display according to claim 1, wherein the light source comprises a laser, and the light shielding structure comprises a black matrix.

14. A method for driving a liquid crystal display as provided in claim 1, comprising:
receiving a signal for an image to be displayed;
controlling voltages supplied to the first electrodes and the second electrodes according to a grayscale value for each sub-pixel in the signal for an image to be displayed, so as to control a curvature of the convex lens structures.

15. A liquid crystal display, comprising:
a backlight source;
a lower substrate disposed at a light exit side of the backlight source;
an upper substrate opposite to the lower substrate; and
a liquid crystal layer between the upper substrate and the lower substrate,
wherein the backlight source comprises a plurality of light sources, wherein light emitted from each of the light sources is incident into the liquid crystal layer in a collimated manner, and
wherein the liquid crystal display further comprises:
a plurality of first electrodes and a plurality of second electrodes, wherein each of the first and second electrodes are disposed between the lower substrate and the liquid crystal layer, and wherein the first electrodes and the second electrodes are each further disposed in a same layer alternately at intervals; and
a light shielding structure in one-to-one correspondence with each light source of the backlight source, wherein orthographic projections of the light source of the backlight source and the light shielding structure on the lower substrate are overlapping,
wherein each of the first electrodes and the second electrodes are configured to receive different voltages during operation of the liquid crystal display to form an electric field, so that liquid crystal molecules within a region of the electric field can be deflected to form a plurality of convex lens structures, wherein the liquid crystal display further comprises a plurality of sub-pixels arranged in an array, each of the sub-pixels being in one-to-one correspondence with the lens structures, the lens structures being in one-to-one correspondence with each light source of the backlight source.

* * * * *